(12) United States Patent
Schmid et al.

(10) Patent No.: US 11,273,590 B2
(45) Date of Patent: Mar. 15, 2022

(54) STARTING-VALVE THROTTLE DEVICE FOR DELIVERING A MELT FROM A SCREW EXTRUDER, AND SYSTEM FOR PREPARING BULK MATERIAL HAVING A STARTING-VALVE THROTTLE DEVICE OF THIS TYPE, AND METHOD FOR DELIVERING A MELT FROM A SCREW EXTRUDER BY MEANS OF A STARTING-VALVE THROTTLE DEVICE OF THIS TYPE

(71) Applicant: COPERION GMBH, Stuttgart (DE)

(72) Inventors: Michael Schmid, Ergolding (DE); Stephan Kiern, Landshut (DE); Ralf Kühn, Erligheim (DE); Markus Schmudde, Murr (DE); Tomi Tratnik, Ludwigsburg (DE)

(73) Assignee: COPERION GMBH, Stuttgart (DE)

( * ) Notice: Subject to any disclaimer, the term of this patent is extended or adjusted under 35 U.S.C. 154(b) by 253 days.

(21) Appl. No.: 16/363,455

(22) Filed: Mar. 25, 2019

(65) Prior Publication Data

US 2019/0291326 A1    Sep. 26, 2019

(30) Foreign Application Priority Data

Mar. 26, 2018    (DE) ...................... 10 2018 204 584.4

(51) Int. Cl.
*B29C 48/92*    (2019.01)
*B29C 48/40*    (2019.01)
(Continued)

(52) U.S. Cl.
CPC ................ *B29C 48/92* (2019.02); *B29B 7/48* (2013.01); *B29B 7/582* (2013.01); *B29B 7/801* (2013.01);
(Continued)

(58) Field of Classification Search
CPC ........... B29B 7/48; B29B 7/582; B29B 7/801; B29C 2948/92514; B29C 2948/926;
(Continued)

(56) References Cited

U.S. PATENT DOCUMENTS 4,984,977 A    1/1991    Grimminger et al.

FOREIGN PATENT DOCUMENTS

CN    101 235 914 A    8/2008
DE    12 31 001 B    12/1966
(Continued)

*Primary Examiner* — Robert J Grun
(74) *Attorney, Agent, or Firm* — McGlew and Tuttle, P.C.

(57) ABSTRACT

A starting-valve throttle device has a housing having a housing recess which is configured therein and in which a switching member is repositionable between an evacuation position and a delivery position. The switching member in the evacuation position configures an evacuation duct which connects an entry duct to an evacuation opening. The switching member in the delivery position configures a passage duct which connects the entry duct to a delivery duct. A throttle member is disposed in the passage duct so as to be repositionable relative to the switching member. On account thereof, a melt flowing through the passage duct is capable of being throttled in a desired manner. The starting-valve throttle device is constructed so as to be simple, compact and reliable. The operation of the starting-valve throttle device and an associated screw extruder is simple and energy-efficient.

20 Claims, 9 Drawing Sheets

(51) Int. Cl.
*B29C 48/25* (2019.01)
*B29B 7/48* (2006.01)
*B29B 7/58* (2006.01)
*B29C 48/255* (2019.01)
*B29B 7/80* (2006.01)

(52) U.S. Cl.
CPC ........ *B29C 48/2556* (2019.02); *B29C 48/268* (2019.02); *B29C 48/269* (2019.02); *B29C 48/40* (2019.02); *B29C 48/255* (2019.02); *B29C 2948/926* (2019.02); *B29C 2948/92514* (2019.02); *B29C 2948/92876* (2019.02); *B29C 2948/92895* (2019.02)

(58) Field of Classification Search
CPC ........... B29C 2948/92876; B29C 2948/92895; B29C 48/255; B29C 48/2556; B29C 48/268; B29C 48/269; B29C 48/40; B29C 48/92
See application file for complete search history.

(56) References Cited

FOREIGN PATENT DOCUMENTS

| | | |
|---|---|---|
| DE | 38 15 897 C1 | 7/1989 |
| DE | 20 2009 011114 U1 | 12/2010 |
| EP | 3 354 440 A1 | 8/2018 |
| JP | 2000 246780 A | 9/2000 |
| JP | 2012 183691 A | 9/2012 |

STARTING-VALVE THROTTLE DEVICE FOR DELIVERING A MELT FROM A SCREW EXTRUDER, AND SYSTEM FOR PREPARING BULK MATERIAL HAVING A STARTING-VALVE THROTTLE DEVICE OF THIS TYPE, AND METHOD FOR DELIVERING A MELT FROM A SCREW EXTRUDER BY MEANS OF A STARTING-VALVE THROTTLE DEVICE OF THIS TYPE

CROSS-REFERENCE TO RELATED APPLICATIONS

This application claims the priority of German Patent Application Serial No. DE 10 2018 204 584.4 filed on Mar. 26, 2018, pursuant to 35 U.S.C. 119(a)-(d), the content of which is incorporated herein by reference in its entirety as if fully set forth herein.

FIELD OF THE INVENTION

The invention relates to a starting-valve throttle device for delivering a melt from a screw extruder, and to a system for preparing bulk material having a starting-valve throttle device. The invention furthermore relates to a method for delivering a melt by means of a starting-valve throttle device.

BACKGROUND OF THE INVENTION

A screw extruder having a starting-valve throttle device flange-fitted thereto is known from U.S. Pat. No. 4,984,977 A. The starting-valve throttle device comprises a housing having a housing recess which is configured therein and in which a starting-valve throttle member is disposed. The starting-valve throttle member has two circular-cylindrical closure portions, a throttle member being disposed therebetween. A starting-valve member which is configured so as to be partially cylindrical is configured on one of the closure portions. The starting-valve throttle device furthermore comprises a pivot drive for pivoting the starting-valve throttle member about a longitudinal axis, as well as a linear drive for displacing the starting-valve throttle member in the direction of the longitudinal axis. The starting-valve throttle member in a first terminal position of the linear drive is operated as a starting valve such that melt fed through an entry duct is delivered through a starting outlet opening. The closure portions in a second terminal position of the linear drive close the housing recess such that the starting outlet opening is closed and the throttle member is in the throttle position. The delivery of the melt fed through the entry duct in the direction of a delivery duct is throttled by means of the throttle member by pivoting the starting-valve throttle member about the longitudinal axis by means of the pivot drive. It is disadvantageous that the construction and the operation of the starting-valve throttle device are complicated.

SUMMARY OF THE INVENTION

The invention is based on the object of achieving a starting-valve throttle device which is constructed so as to be simple and reliable and enables a simple and energy-efficient operation.

This object is achieved by a starting-valve throttle device for delivering a melt from a screw extruder, having a housing and a housing recess configured therein; an entry duct for feeding the melt, said entry duct being configured in the housing and opening into the housing recess; a delivery duct for delivering the melt, said delivery duct being configured in the housing and opening into the housing recess; an evacuation opening for evacuating the melt during a starting procedure of the screw extruder; and a switching member, which is disposed in the housing recess and is repositionable between an evacuation position and a delivery position, and which in the evacuation position at least in portions configures an evacuation duct for connecting the entry duct to the evacuation opening, and which in the delivery position configures a passage duct for connecting the entry duct and the delivery duct, wherein a throttle member is disposed in the passage duct so as to be repositionable relative to the switching member. On account of a throttle member being disposed in the passage duct so as to be repositionable relative to the switching member the throttle member is activatable independently of the switching member. Simple and energy-efficient throttling of the melt is thus possible in the delivery position, without any repositioning of the switching member being required. On account of the throttle member being activatable independently of the switching member, the construction of the starting-valve throttle device in terms of the drive is moreover simplified.

The throttle member is preferably configured as a throttle flap or as a butterfly throttle, respectively. The throttle flap configures a throttle front side and a throttle rear side which are connected to one another by way of a throttle end side. The throttle front side, or the throttle rear side, respectively, in comparison to the throttle end side has a higher flow resistance in relation to the melt. A maximum flow resistance is set by means of the throttle front side in a maximum throttle position, whereas a minimum flow resistance is set by means of the throttle end side in a minimum throttle position.

When the switching member is configured in multiple parts, the throttle member is thus disposed in the passage duct so as to be repositionable relative to at least one switching-member component. The throttle member can be disposed so as not to be repositionable relative to at least one switching member component. For example, the switching member can be configured in two parts and comprise a first switching-member component and a second switching-member component. The throttle member is disposed in the passage duct so as to be repositionable relative to the first switching-member component. The second switching-member component is connected to the throttle-member drive-shaft such that the throttle member is not repositionable relative to the second switching-member component. The second switching-member component configures an evacuation duct and/or an available passage duct. No throttle member is disposed in the available passage duct.

A starting-valve throttle device configured such that the throttle member is pivotable about a throttle-member pivot axis guarantees a simple and energy-efficient operation. On account of the throttle member in the passage duct being pivotable about the throttle-member pivot axis, throttling the melt in the delivery position is possible in a simple and rapid manner. Varying the position of the throttle member is, comparatively energy-efficient by virtue of a minor mass to be moved. The pressure loss in a minimum throttle position of the throttle member is minor such that the screw extruder is capable of being operated in an energy-efficient manner. The throttle member is preferably mounted so as to be pivotable on the switching member. The mounting of the throttle member is in particular embodied in a sealed manner such that no melt can escape by virtue of the mounting.

A starting-valve throttle device configured such that the throttle member is repositionable by means of a throttle-member drive guarantees a simple and reliable construction. On account of the throttle member being repositionable by means of a dedicated throttle-member drive, a reliable throttle-member drive which is of simple construction can be used. The throttle-member drive does not have to reposition the switching member such that the throttle-member drive is capable of being conceived and optimized exclusively with a view to the repositioning of the throttle member. The throttle-member drive is preferably an electric drive motor which pivots the throttle member about a throttle-member pivot axis. The throttle-member drive is fastened to the housing or to the switching member.

A starting-valve throttle device configured such that the throttle-member drive is fastened to the switching member guarantees a simple construction and a simple operation. On account of the throttle-member drive being fastened to the switching member, the throttle-member drive is repositioned conjointly with the switching member such that the throttle-member drive and the throttle member, by virtue of the repositioning of the switching member from the evacuation position to the delivery position, do not carry out any movement relative to the switching member. The throttle-member drive is preferably configured as an electric drive motor such that the repositioning of the switching member is capable of being compensated for in a simple manner by way of the electric lines.

A starting-valve throttle device configured such that the throttle member is fastened to a throttle-member driveshaft, and the throttle-member driveshaft at least in portions extends through the switching member guarantees a simple and reliable construction. The throttle member is mounted in particular on both sides by the throttle-member driveshaft. The throttle-member driveshaft moreover enables a simple assembly of the throttle member in the passage duct. The throttle-member driveshaft is preferably sealed in relation to the switching member. The throttle-member driveshaft is preferably sealed on both sides of the throttle member in the switching member and is pivotably mounted. The throttle-member driveshaft is in particular freely accessible in such a manner that a throttle-member drive for repositioning the throttle member is capable of being connected to the throttle-member driveshaft. The throttle member is fastened in rotationally fixed manner to the throttle-member driveshaft.

A starting-valve throttle device configured such that the throttle member for absorbing compressive forces that act in a flow direction of the melt is fastened so as to be eccentric on a throttle-member driveshaft guarantees a reliable construction. On account of the eccentric fastening of the throttle member to the throttle-member driveshaft, compressive forces acting in the flow direction of the melt can be reliably absorbed by virtue of a greater wall thickness. Any impermissible flexing as a result of compressive forces is avoided on account thereof. The throttle member is preferably configured as a throttle flap, and the throttle flap is fastened so as to be eccentric to the throttle-member driveshaft in such a manner that a wall thickness between the throttle-member driveshaft and a throttle front side is greater than a wall thickness between the throttle-member driveshaft and a throttle rear side. The compressive forces acting upstream are reliably absorbed on account of the greater wall thickness on the upstream throttle front side.

A starting-valve throttle device configured such that the passage duct from an entry opening to a throttle-member pivot axis of the throttle member has, at least in portions, a cross section area that increases in size guarantees a simple and energy-efficient operation. On account of the cross section area of the passage duct that increases in size at least in portions, a minor flow resistance and thus a minor pressure build-up, or pressure loss, perspective, is enabled in a minimum throttle position of the throttle member. The cross section area of the throttle member in the minimum throttle position is at least in part compensated for by the cross section area of the passage duct that increases in size. A pressure loss at the throttle member in the minimum throttle position is thus substantially avoided such that a simple and energy-efficient operation is possible. A melt pump for the pressure build-up downstream of the starting-valve throttle device can in particular be dispensed with. The throttle member is preferably configured as a throttle flap which comprises a throttle front side and a throttle rear side as well as a throttle end side connecting said throttle front side and throttle rear side. The throttle front side and the throttle rear side, proceeding from the throttle end side, when viewed in the cross-section and perpendicularly to the throttle-member pivot axis, up to the throttle-member pivot axis run in particular at least in portions in a mutually wedge-shaped manner. The throttle end side, when viewed in the cross section and perpendicularly to the throttle-member pivot axis, is preferably configured so as to be curved. On account thereof, the flow resistance of the throttle flap in the minimum throttle position is optimized.

A starting-valve throttle device configured such that the passage duct at an entry opening has an available flow cross section area $A_1$, and in a minimum throttle position of the throttle member, an available flow cross section area $A_2$ along the throttle member such that $0.5 \leq A_2/A_1 \leq 1.3$, in particular $0.6 \leq A_2/A_1 \leq 1.2$, in particular $0.7 \leq A_2/A_1 \leq 1.1$, and in particular $0.8 \leq A_2/A_1 \leq 0.9$, guarantees a simple and energy-efficient operation. On account of the ratio of the available flow cross section areas $A_2/A_1$, a minor flow resistance and a minor pressure build-up, or pressure loss, respectively, is guaranteed in the minimum throttle position. The available flow cross section area $A_2$ refers in particular to a section plane which runs through the throttle-member pivot axis and perpendicularly to a flow direction, or conveying direction, respectively, of the melt. The section plane is in particular parallel with a section plane which is defined by the entry opening and which runs perpendicularly to the flow direction, or the conveying direction, respectively. The throttle member is preferably configured as a throttle flap. A throttle front side and a throttle rear side in the minimum throttle position run so as to be substantially parallel with the flow direction such that a throttle end side that connects the throttle front side and the throttle rear side substantially determines the flow resistance.

A starting-valve throttle device configured such that the switching member is repositionable by means of the switching-member drive guarantees a simple construction and operation. On account of the switching member being repositionable by means of a dedicated switching-member drive, the construction in terms of the drive and the repositioning of the switching member are simple. The switching-member drive is in particular configured as an electric drive motor. The switching-member drive is preferably fastened to the housing. On account thereof, the switching-member drive is activatable in a simple manner. The switching-member drive is configured as a linear drive or as a rotary drive.

A starting-valve throttle device configured such that the switching member configures a switching-member repositioning axis guarantees a simple operation. The switching member in the case of a first embodiment is repositionable in a linear manner along the switching-member repositioning axis. In the case of a second embodiment the switching-member is pivotable about the switching-member repositioning axis.

A starting-valve throttle device configured such that the throttle-member pivot axis and the switching-member repositioning axis run so as to be mutually parallel, in particular so as to be mutually concentric, guarantees a simple construction and operation. On account of the throttle-member pivot axis running parallel with the switching-member repositioning axis, simple switching between the evacuation position and the delivery position is possible. When the switching member is repositioned in a linear manner between the evacuation position and the delivery position, there is thus no throttle-member drive and/or throttle-member driveshaft that impedes the switching between the evacuation position and the delivery position. When the switching member is pivoted about the switching-member repositioning axis between the evacuation position and the delivery position the pivoting is thus not impeded by a throttle-member drive and/or a throttle-member driveshaft.

A starting-valve throttle device configured such that the switching member is pivotable about the switching-member repositioning axis guarantees a simple construction as well as a simple and energy-efficient operation. The switching member is pivotably mounted in the housing recess. The switching-member repositioning axis is a switching-member pivot axis. The switching member in the housing recess is preferably fixed in the direction of the switching-member repositioning axis. The switching member, for switching between the evacuation position and the delivery position, is in particular pivotable by at least 90° about the switching-member repositioning axis. The switching-member repositioning axis is preferably aligned so as to be horizontal or vertical.

A starting-valve throttle device configured such that the switching member is repositionable in a linear manner along the switching-member repositioning axis guarantees a simple construction as well as a simple and energy-efficient operation. The switching member is disposed so as to be repositionable in a linear manner in the housing recess. The switching between the evacuation position and the delivery possession is performed by repositioning the switching member in a linear manner along the switching-member repositioning axis in the housing recess. The switching-member repositioning axis is preferably aligned so as to be horizontal or vertical.

A starting-valve throttle device configured such that in a non-throttled delivery position an available passage duct for connecting the entry duct and the delivery duct is configured in the switching member guarantees an energy-efficient operation. On account of an available passage duct being additionally configured in the switching member, the switching member can be repositioned to a non-throttled delivery position. No throttle member is disposed in the available passage duct, such that the melt in the non-throttled delivery position can flow in an unimpeded manner through the available passage duct. No substantial pressure loss is caused on account thereof. The operation of the screw extruder as well as of the starting-valve throttle device is thus energy-efficient.

The invention is furthermore based on the object of achieving a system for preparing bulk material, which is of simple and reliable construction and enables a simple and energy-efficient operation.

This object is achieved by a system for preparing bulk material, the system having a screw extruder for melting the bulk material and providing a melt, and a starting-valve throttle device according to the invention. The screw extruder is in particular configured as a multi-shaft screw extruder, preferably as a dual-shaft screw extruder. The treatment element shafts of the screw extruder are in particular capable of being driven, or are driven, respectively, rotatingly in the same direction. The treatment element shafts are preferably configured so as to mesh tightly. The system comprises in particular a control installation which controls the operation of the screw extruder and/or of the starting-valve throttle device. The control installation controls in particular the repositioning of the switching member between the evacuation position and the delivery position, and/or the repositioning of the throttle member in the passage duct relative to the switching member, in order for the melt to be throttled.

The invention is furthermore based on the object of achieving a method which enables a simple and energy-efficient delivery of a melt by means of a starting-valve throttle device.

This object is achieved by a method for delivering a melt from a screw extruder by means of a starting-valve throttle device, said method comprising the steps of providing a starting-valve throttle device according to the invention; repositioning the switching member from an evacuation position to a delivery position; delivering melt through the passage duct of the switching member and the delivery duct; and pivoting the throttle member relative to the switching member in the passage duct. The advantages of the method according to the invention correspond to the advantages already described of the starting-valve throttle device according to the invention. The method according to the invention can in particular also comprise providing a system for preparing of bulk material, the system having a screw extruder for melting the bulk material and providing a melt, and a starting-valve throttle device according to the invention.

A method configured such that the switching member situated in the delivery position is repeatedly repositioned so as to avoid any blocking of the switching member by virtue of melt which has made its way between the switching member and the housing guarantees a simple and reliable delivery of the melt. On account of the switching member in operation being repeatedly repositioned slightly from the delivery position, thus being slightly pivoted or slightly repositioned in a linear manner, and subsequently being moved back to the delivery position, it is avoided that melt, which during the starting procedure has made its way into a gap between the switching member and the housing and remains therein over a comparatively long time period and solidifies in the gap, permanently blocks the movement of the switching member. The material created by the solidification of the melt in the gap is released by the slight repositioning, or by the described micro-movement, of the switching member. Blocking of the switching member is avoided in a simple and reliable manner on account thereof.

Further features, advantages, and details of the invention are derived from the description hereunder of a plurality of exemplary embodiments.

DESCRIPTION OF THE PREFERRED EMBODIMENTS

Figure 1:
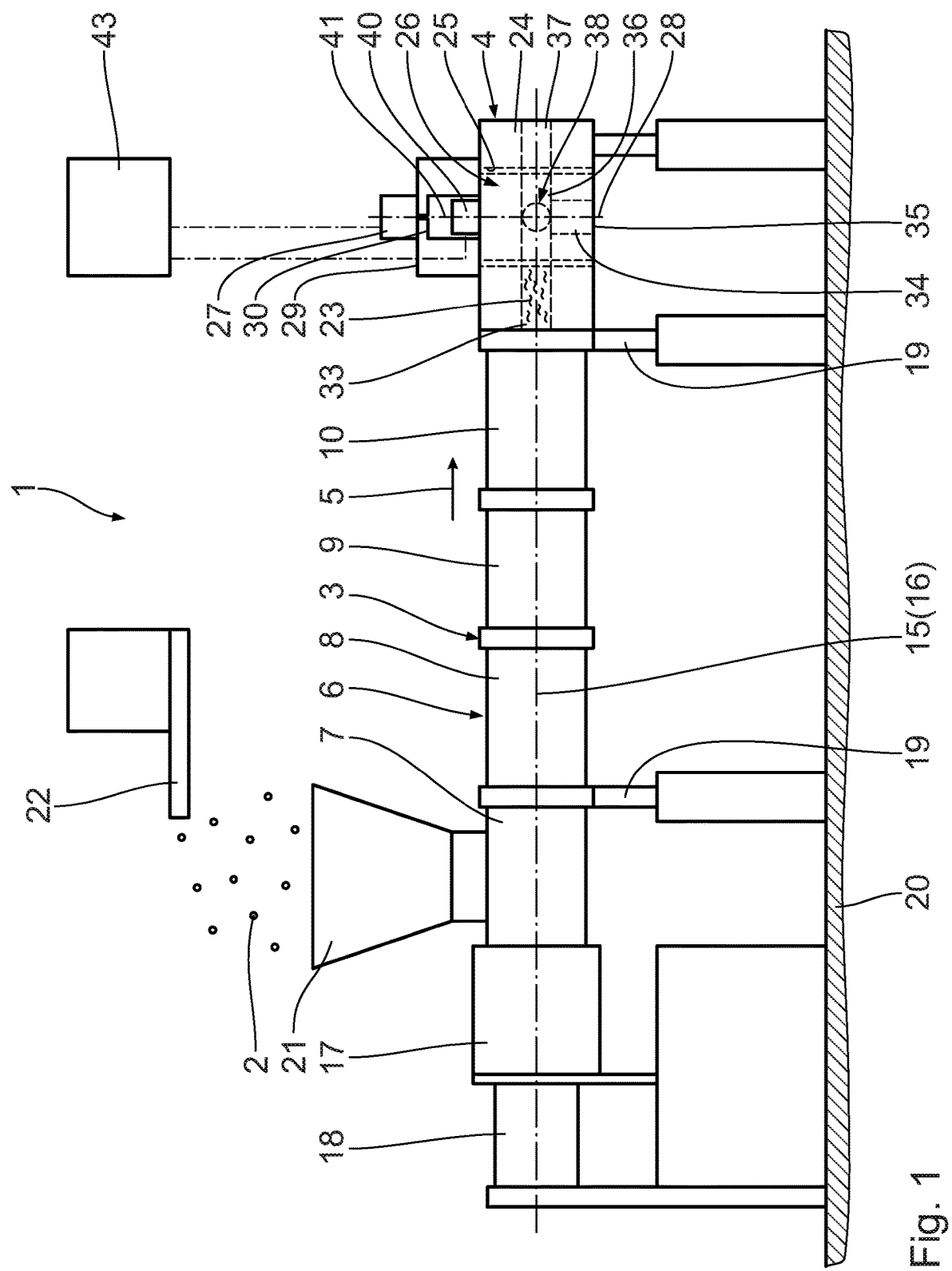
FIG. 1 shows a schematic illustration of a system for preparing bulk material, having a multi-shaft screw extruder and a starting-valve throttle device flange-fitted thereto, according to a first exemplary embodiment.

A first exemplary embodiment of the invention is described hereunder by means of FIGS. 1 to 5. A system 1 for preparing bulk material 2 comprises a multi-shaft screw extruder 3 and a starting-valve throttle device 4 which in a conveying direction 5 is disposed after the multi-shaft screw extruder 3.

The multi-shaft screw extruder 3 is configured as a dual-shaft screw extruder. The screw extruder 3 has a housing 6 which comprises a plurality of housing portions 7, 8, 9, 10 which are disposed in succession and are fastened to one another. Two axially parallel housing bores 11, 12 which penetrate one another and in the cross section have the shape of a FIG. 8 lying flat are configured in the housing 6. Two tightly meshing treatment element shafts 13, 14 are disposed in the housing bores 11, 12, said treatment element shafts 13, 14 being capable of being rotatingly driven about associated rotation axes 15, 16. The treatment element shafts 13, 14 by way of a transfer box 17 are rotatingly driven in the same direction, thus in identical rotating directions, by a drive motor 18. The starting-valve throttle device 4, the housing 6, the transfer box 17, and the drive motor 18 are fastened to a foundation 20 by way of support stands 19.

An inlet funnel 21 in which the bulk material 2 to be prepared is fed into the screw extruder 3 by way of a metering installation 22 opens into the first housing portion 7 that is configured as an intake zone. The treatment element shafts 13, 14 in the screw extruder 3 configure a kneading zone in which the bulk material 2 is melted so as to form a melt 23. The melt 23 is fed to the starting-valve throttle device 4 which is flange-fitted to the last housing portion 10.

The starting-valve throttle device 4 comprises a housing 24 in which a cylindrical housing recess 25 is configured. A switching member 26 which is configured in a corresponding manner so as to be cylindrical and which by means of a switching-member drive 27 in the housing recess 25 is pivotable about a switching-member repositioning axis 28 is disposed in the housing recess 25. The switching member 26 is disposed so as to be fixed, thus not repositionable, in the direction of the switching-member repositioning axis 28.

The switching-member drive 27 is configured as an electric drive motor. The switching-member drive 27 by means of a fastening frame 29 is fastened to the housing 24. The switching-member drive 27 for pivoting the switching member 26 about the switching-member repositioning axis 28 is connected by means of a switching-member drive shaft 30. The switching member 26 by means of annular bearing and sealing units 31, 32 is mounted in the housing recess 25 so as to be pivotable and sealed in relation to the melt 23.

An entry duct 33 which connects the housing bores 11, 12 to the housing recess 25 is configured in the housing 24. The entry duct 33 serves for feeding the melt 23 to the switching member 26. The switching member 26 is pivotable between an evacuation position, visualized in FIG. 2, and a delivery position, visualized in FIG. 3. The switching member 26, for switching between the evacuation position and the delivery position, is pivotable by at least 90° about the switching-member repositioning axis 28.

The switching member 26 configures an evacuation duct 34 which delimits an evacuation opening 35 and in the evacuation position connects the entry duct 33 to the environment. The switching member 26 furthermore configures a passage duct 36 which in the delivery position connects the entry duct 33 to a delivery duct 37. A pelletizing installation which is fed the melt 23 delivered from the delivery duct 37 is disposed downstream of the starting-valve throttle device 4, for example.

A throttle member 38 which is positionable relative to the switching member 26 is disposed in the passage duct 36. The throttle member 38 is connected in a rotationally fixed manner to a throttle-member drive shaft 39. The throttle-member drive shaft 39 on both sides of the throttle member 38 is mounted on the switching member 26 so as to be pivotable and sealed. The throttle member 38 by means of a throttle-member drive 40 is pivotable about a throttle-member pivot axis 41. The throttle-member pivot axis 41 runs so as to be concentric with the switching-member pivot axis 28. The throttle-member drive 40 is configured as an electric drive motor. The throttle-member drive 40 is fastened to the switching member 26. To this end, the fastening frame 29 as well as the switching member drive shaft 30 configure the installation space required. In order for the throttle-member drive shaft 39 to be connected to the throttle-member drive 40, the throttle-member drive shaft 39 extends through a receptacle bore 42 which is configured in the switching member 26.

In order for the switching-member drive 27 and the throttle-member drive 40 to be actuated, the system 1, or the starting-valve throttle device 4, respectively, comprises a control installation 43.

Figure 4:
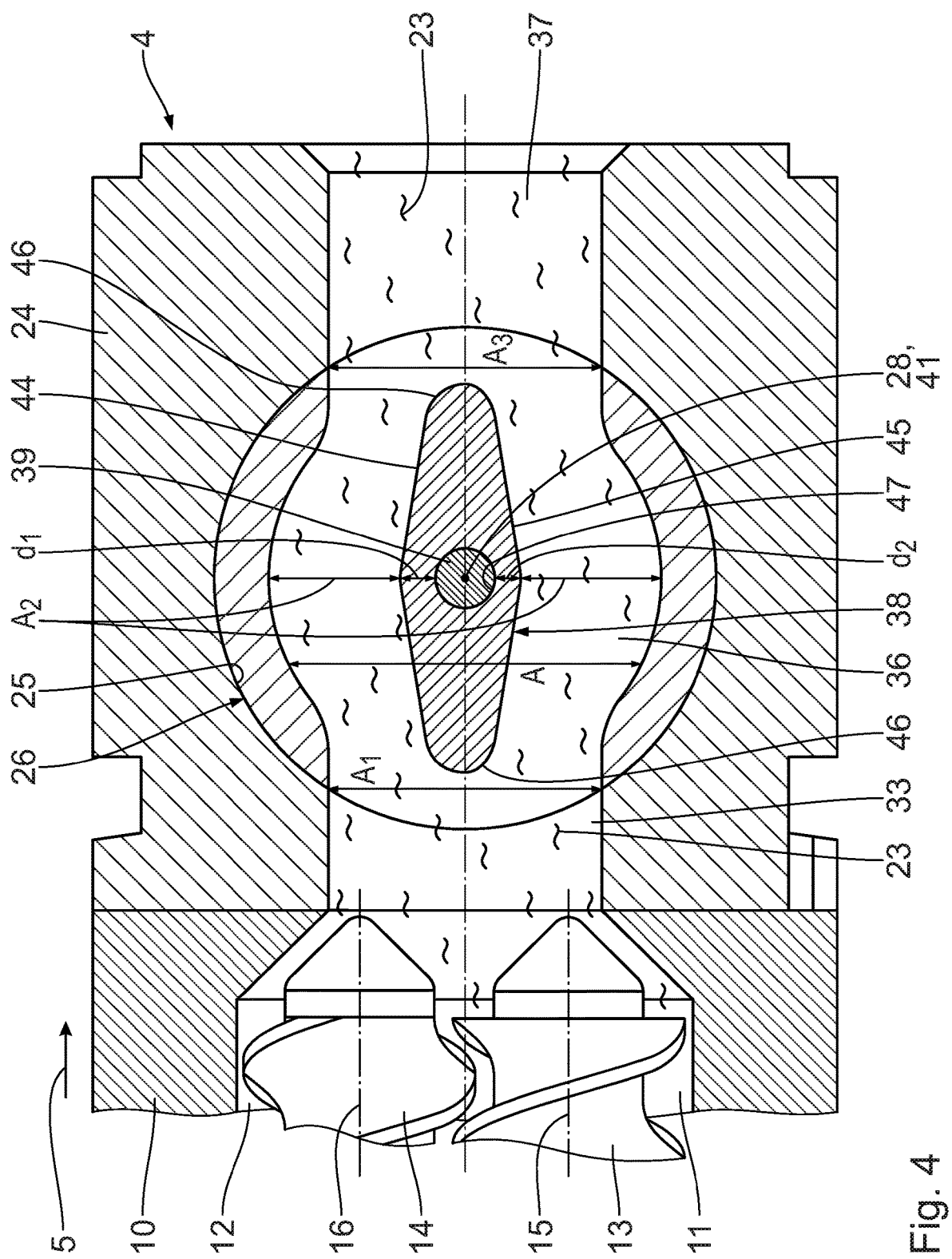
FIG. 4 shows a section through the starting-valve throttle device along the section line IV-IV in FIG. 3, in a minimum throttle position of a throttle member.
Figure 5:
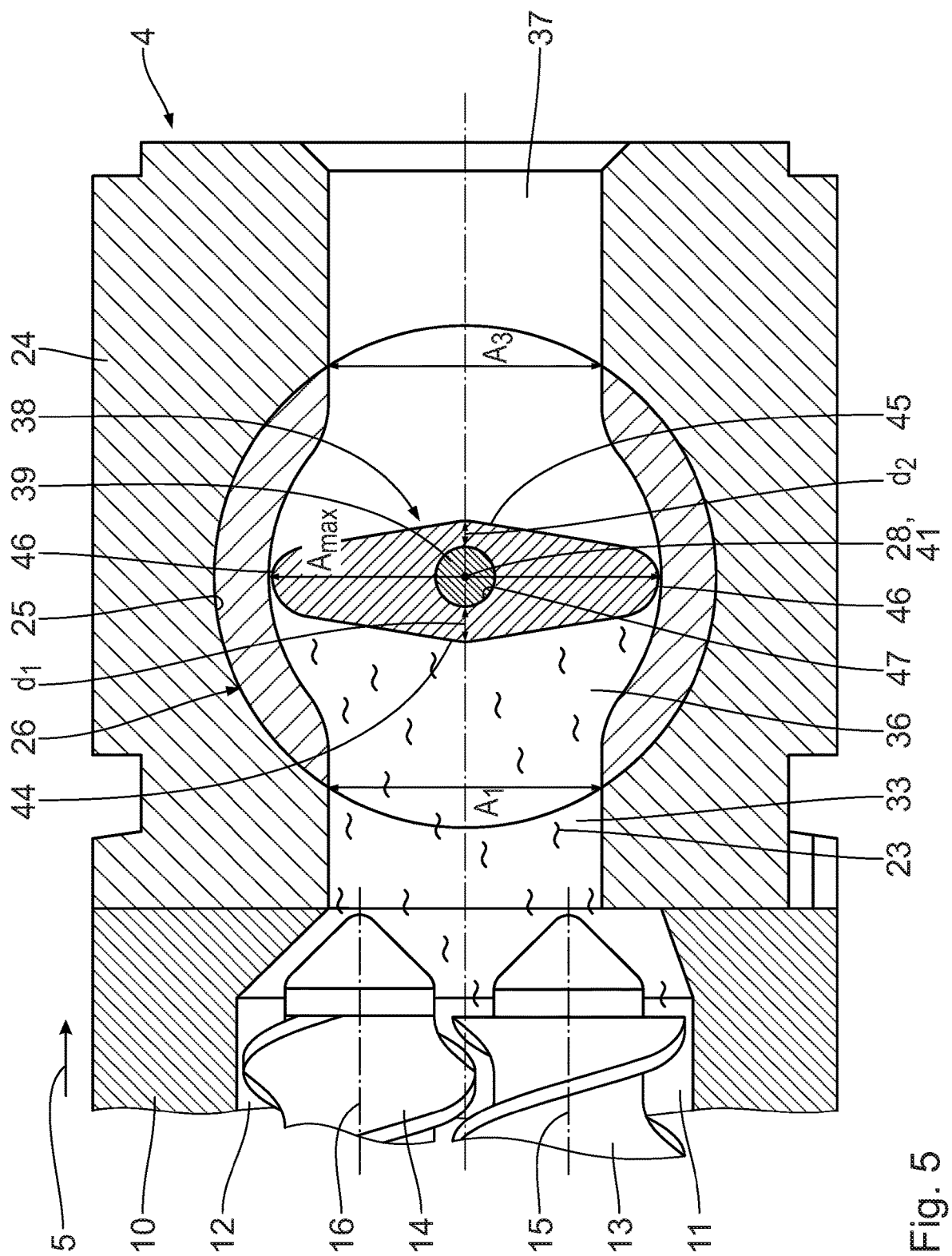
FIG. 5 shows a section through the starting-valve throttle device corresponding to FIG. 4, in a maximum throttle position of the throttle member.

The throttle member 38 is configured as a throttle flap. The throttle flap is also referred to as a butterfly throttle. The throttle member 38 has a throttle front side 44, a throttle rear side 45, and a throttle end side 46 that connects said throttle front side 44 and said throttle rear side 45. The throttle front side 44 and the throttle rear side 45 are configured substantially in the shape of a circular disc. The throttle end side 46 is configured so as to be substantially annular and connects the throttle front side 44 and the throttle rear side 45 to the disc-shaped throttle member 38. A shaft bore 47 which extends through the encircling throttle end side 46 is configured in the throttle member 38. The throttle member 38 is fastened so as to be eccentric to the throttle-member drive shaft 39 in such a manner that a wall thickness $d_1$ of the throttle member 38 between the shaft bore 47 and the throttle front side 44 is greater than a wall thickness $d_2$ between the shaft bore 47 and the throttle rear side 45. The throttle front side 44 and the throttle rear side 45, proceeding from the throttle end side 46 up to the throttle-member pivot axis 41, when viewed in a section plane running perpendicularly to the throttle-member pivot axis 41 and corresponding to FIG. 4, run in a wedge-shaped manner, or so as to widen in a wedge-shaped manner, respectively. The throttle end side 46, viewed in the section plane corresponding to FIG. 4, is moreover configured so as to be curved towards the throttle-member pivot axis 41. On account thereof, a minimum flow resistance is achieved in the minimum throttle position of the throttle member 38 illustrated in FIG. 4.

The passage duct 36 has a varying cross section area A. The passage duct 36 at an entry opening 48 has a cross section area $A_1$. The cross section area A of the passage duct 36, proceeding from the entry opening 48, increases in size up to a maximum cross section area $A_{max}$. The maximum cross section face $A_{max}$ is present in a section plane which runs through the throttle-member pivot axis 41 and is disposed so as to be perpendicular to the conveying direction 5. The cross section area A of the passage duct 36, proceeding from the maximum cross section area $A_{max}$, decreases in size again until a cross section area $A_3$ is present at an exit opening 49. The following can apply to the cross section area A3: $A_3 \geq A_1$ or $A_3 \leq A_1$.

The cross section area $A_1$ at the entry opening 48 is equal to an available flow cross section area $A_1$. In the minimum throttle position visualized in FIG. 4, an available flow cross section area $A_2$ which results from the difference between the cross section area A and the cross section area of the throttle member 38 results in the region of the throttle member 38. The available flow cross section area $A_2$ in FIG. 4 is visualized in an exemplary manner in the region of the maximum cross section area $A_{max}$. The following applies to the available flow cross section area $A_2$ along the throttle member 38: $0.5 \leq A_2/A_1 \leq 1.3$, in particular $0.6 \leq A_2/A_1 \leq 1.2$, in particular $0.7 \leq A_2/A_1 \leq 1.1$, and in particular $0.8 \leq A_2/A_1 \leq 0.9$.

Figure 2:
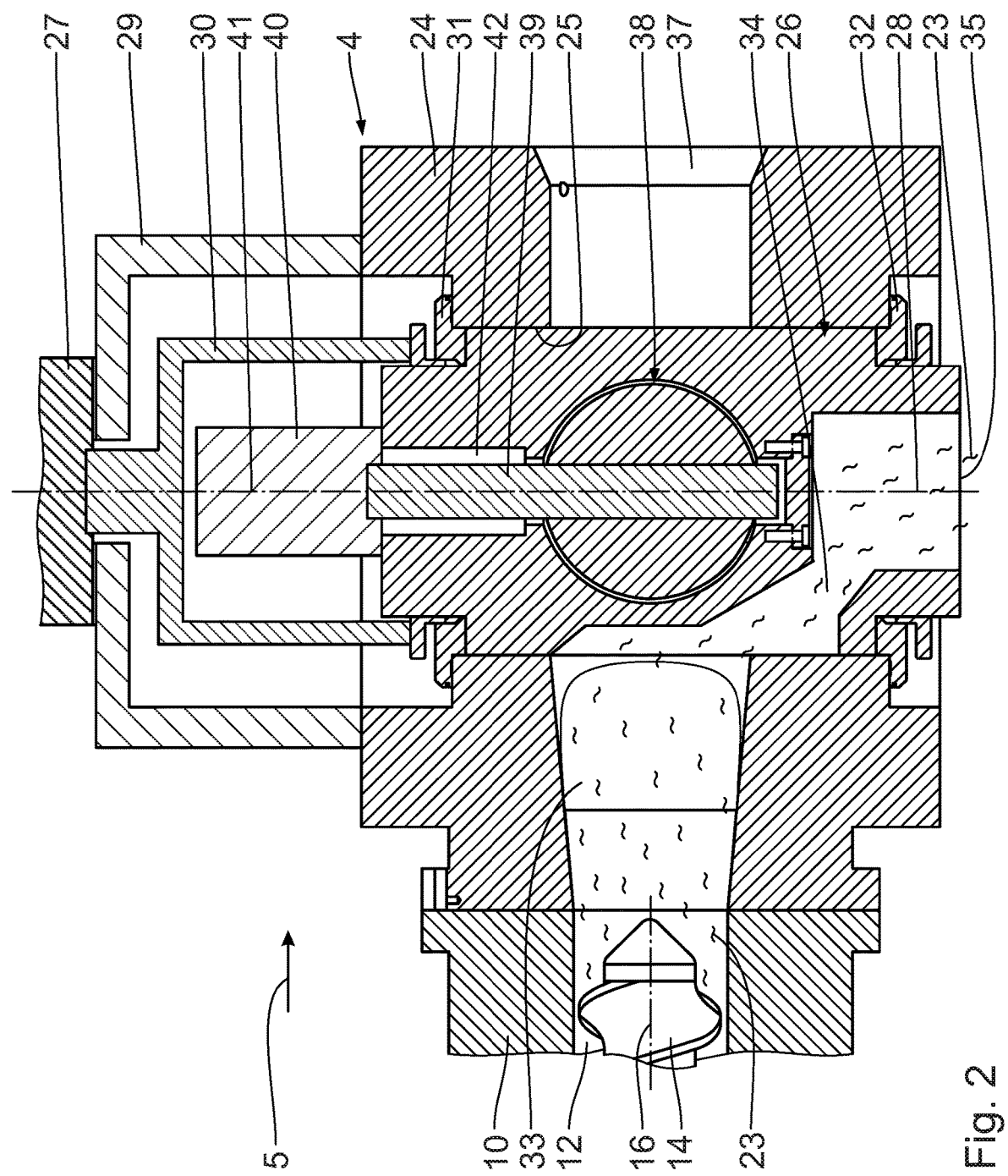
FIG. 2 shows a section through the starting-valve throttle device in FIG. 1, in an evacuation position.

The functional mode of the system 1 and of the starting-valve throttle device 4 is described hereunder:

In order for the screw extruder 3 to be started, the starting-valve throttle device 4 is activated such that the switching member 26 is situated in the evacuation position illustrated in FIG. 2. Bulk material 2 which in the screw extruder 3 is melted so as to form the melt 23 is fed to the screw extruder 3 by means of the metering installation 22. The melt 23 during the starting procedure is evacuated by means of the starting-valve throttle device 4 until a desired quality of the melt 23 has been reached. To this end, the melt 23 flows through the entry duct 33 and the evacuation duct 34 and is discharged into the environment through the evacuation opening 35. This is visualized in FIG. 2.

Figure 3:
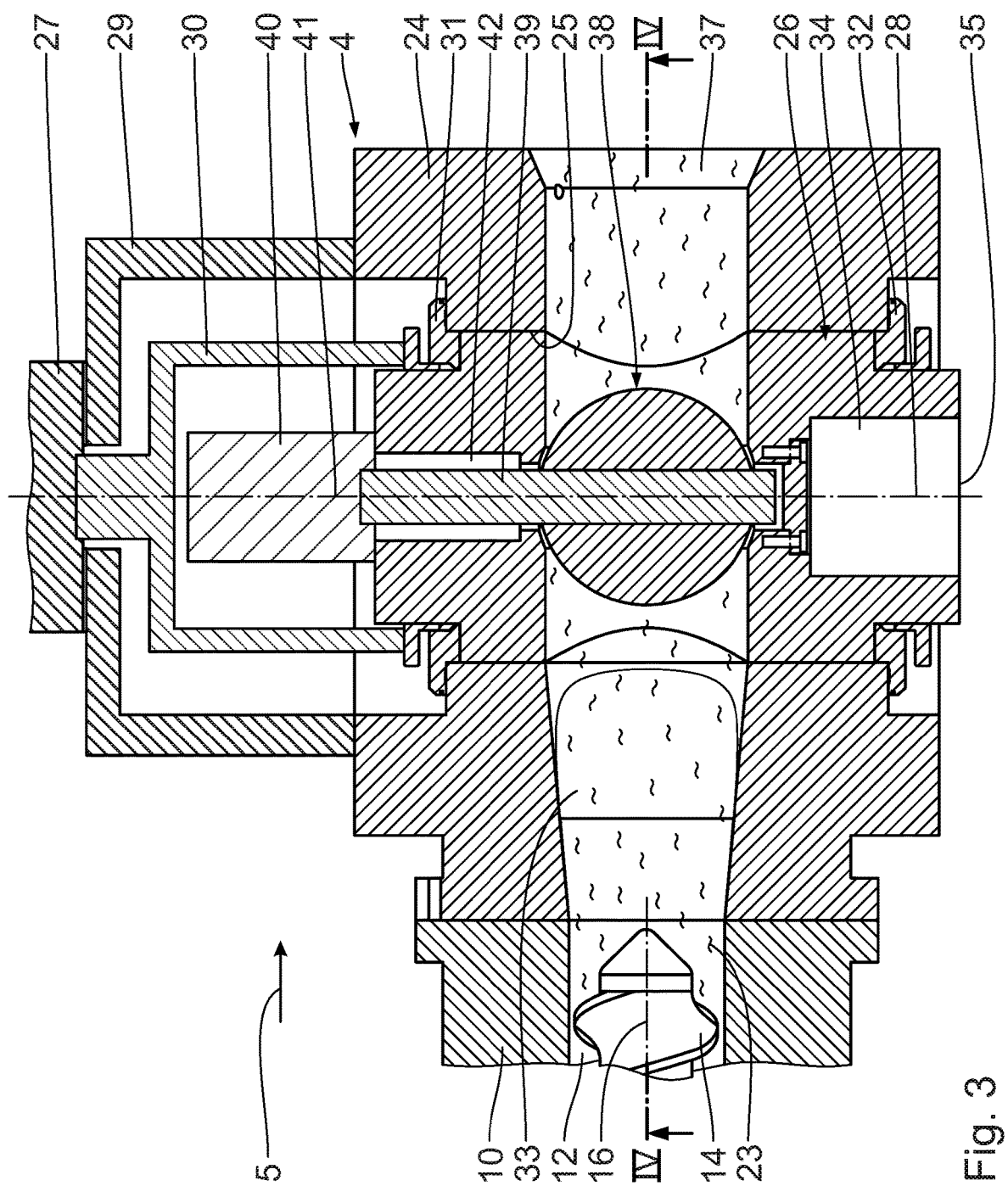
FIG. 3 shows a section through the starting-valve throttle device in FIG. 1, in a delivery position.

When the desired quality of the melt 23 has been reached, the switching member 26 is thus repositioned from the evacuation position to the delivery position visualized in FIG. 3. To this end, the switching member 26 by means of the switching-member drive 27 is pivoted by 90° about the switching-member position axis 28 such that the passage duct 36 connects the entry duct 33 to the delivery duct 37. The throttle member 38 is pivoted already in the evacuation position to a desired throttle position, for example to the minimum throttle position. When the throttle member 38 in the evacuation position of the switching member 26 is situated in the minimum throttle position, the throttle member 38 without pivoting is thus also situated in the delivery position of the switching member 26 in the minimum throttle position. The melt 23 is conveyed through the entry duct 33, the passage duct 36, and the delivery duct 37 and is delivered from the starting-valve throttle device 4. The melt 23 is subsequently fed to a pelletizing installation, for example.

The flow of the melt 23 in the delivery position of the switching member 26 when required can be throttled by means of the throttle member 38. To this end, the throttle member 38 by means of the throttle-member drive 40 is pivoted about the throttle-member pivot axis 41 such that the available flow cross section area $A_2$ is reduced in comparison to the minimum throttle position. The throttle member 38 in the maximum throttle position illustrated in FIG. 5 closes the passage duct 36 in a substantially complete manner. The compressive forces acting in the flow direction of the melt 23, or in the conveying direction 5, respectively, are reliably absorbed on account of the eccentric disposal of the throttle member 38 on the throttle-member drive shaft 39.

Figure 6:
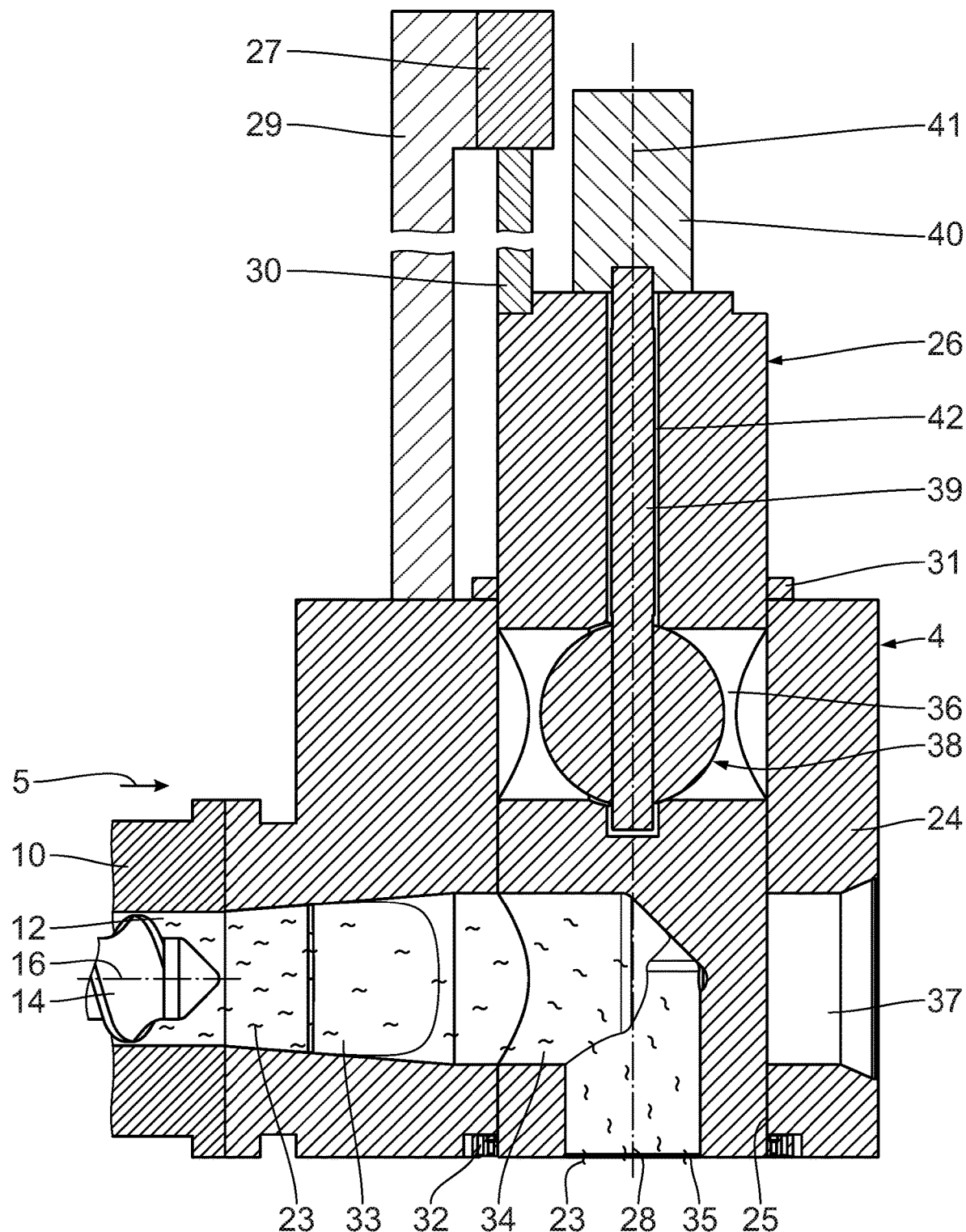
FIG. 6 shows a section through a starting-valve throttle device according to a second exemplary embodiment, in an evacuation position.
Figure 7:
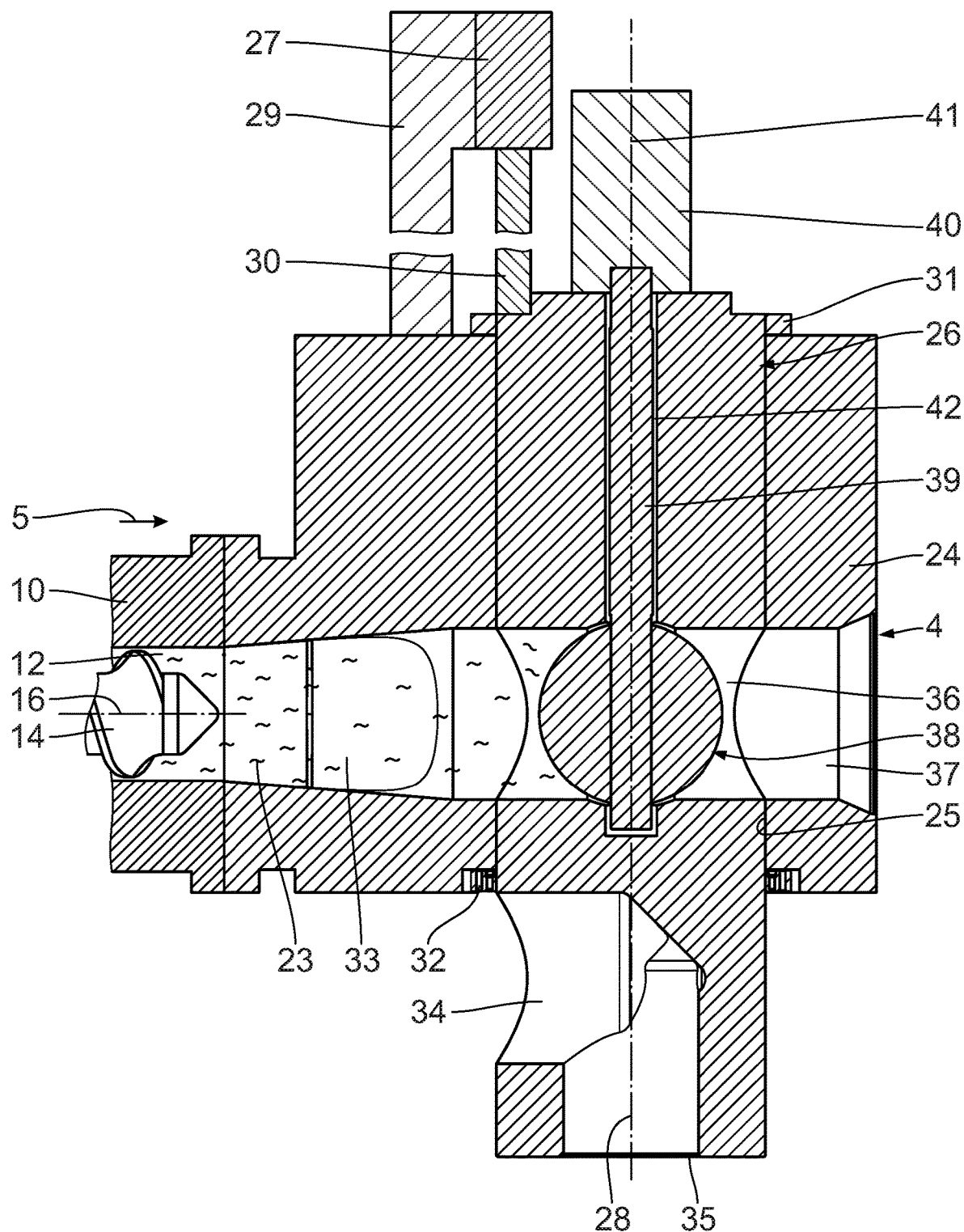
FIG. 7 shows a section through the starting-valve throttle device according to the second exemplary embodiment, in a delivery position.

A second exemplary embodiment of the invention is described hereunder by means of FIGS. 6 and 7. By contrast to the first exemplary embodiment, the switching member 26 by means of the switching member drive 27 is repositionable in a linear manner along the switching-member repositioning axis 28 in the housing recess 25. FIG. 6 visualizes the starting-valve throttle device 4 in the evacuation position of the switching member 26. In order to be switched between the evacuation position and the delivery position, the switching member 26 by means of the switching-member drive 27 is repositioned in a linear manner along the switching-member repositioning axis 28 until the passage duct 36 connects the entry duct 33 to the delivery duct 37. The delivery position is visualized in FIG. 7. The throttle member 38 in the delivery position is pivotable about the throttle-member pivot axis 41 in the manner already described, such that the flow of the melt 23 can be throttled in the desired manner. In terms of the further construction and the further functional mode, reference is made to the first exemplary embodiment.

Figure 8:
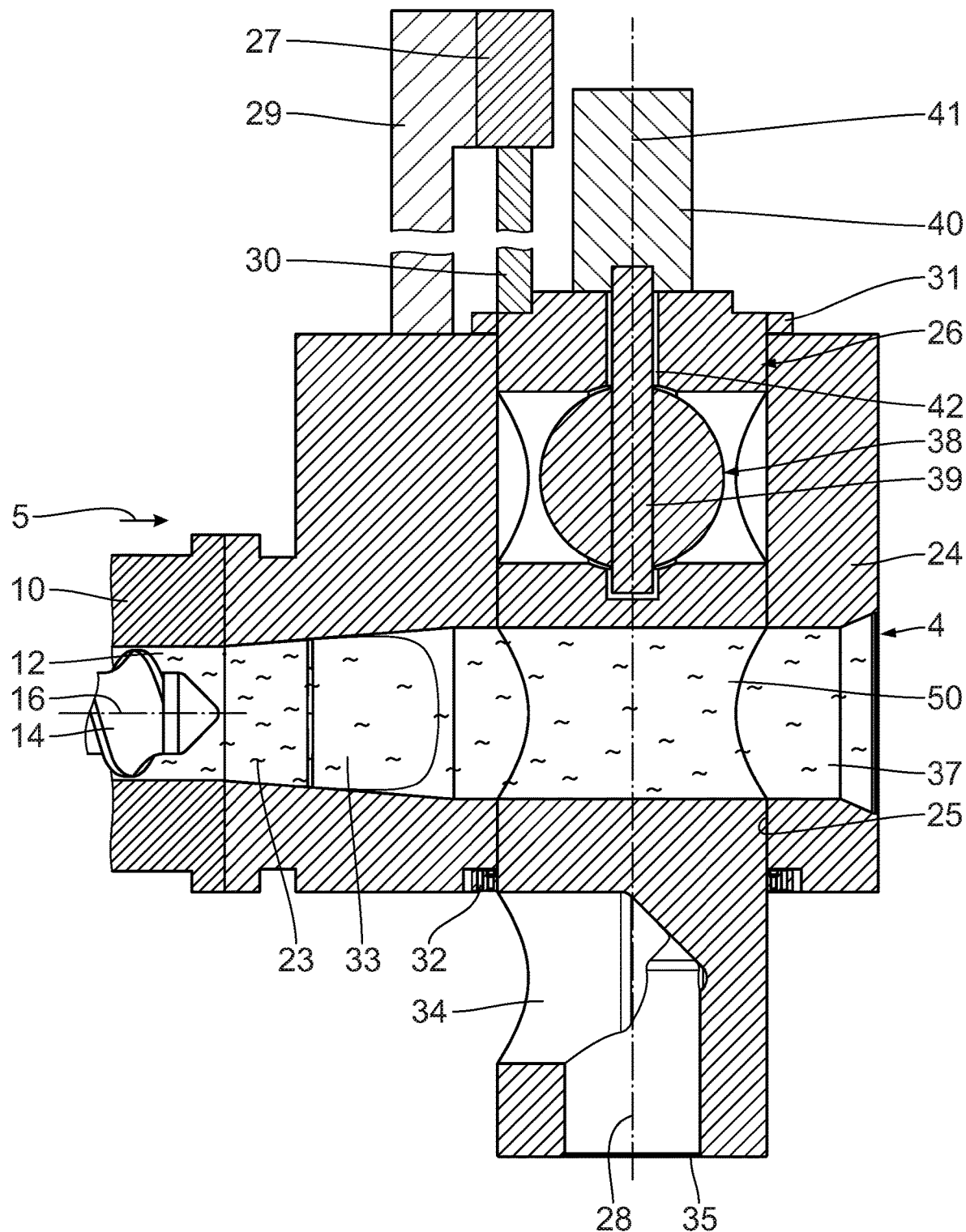
FIG. 8 shows a section through a starting-valve throttle device according to a third exemplary embodiment, in a non-throttled delivery position.

A third exemplary embodiment of the invention is described hereunder by means of FIG. 8. By contrast to the preceding exemplary embodiments, an available passage duct 50 in which, by contrast to the passage duct 36, no throttle member is disposed is configured in the switching member 26. The available passage duct 50 is configured between the passage duct 36 and the evacuation duct 34. The available passage duct 50 in a non-throttled delivery position which is visualized in FIG. 8 connects the entry duct 33 to the delivery duct 37. In the non-throttled delivery position, the melt 23 can flow without any substantial pressure loss through the available passage duct 50, on account of which an energy-efficient operation of the system 1 is enabled. In terms of the further construction and of the further functional mode reference is made to the preceding exemplary embodiments.

Figure 9:
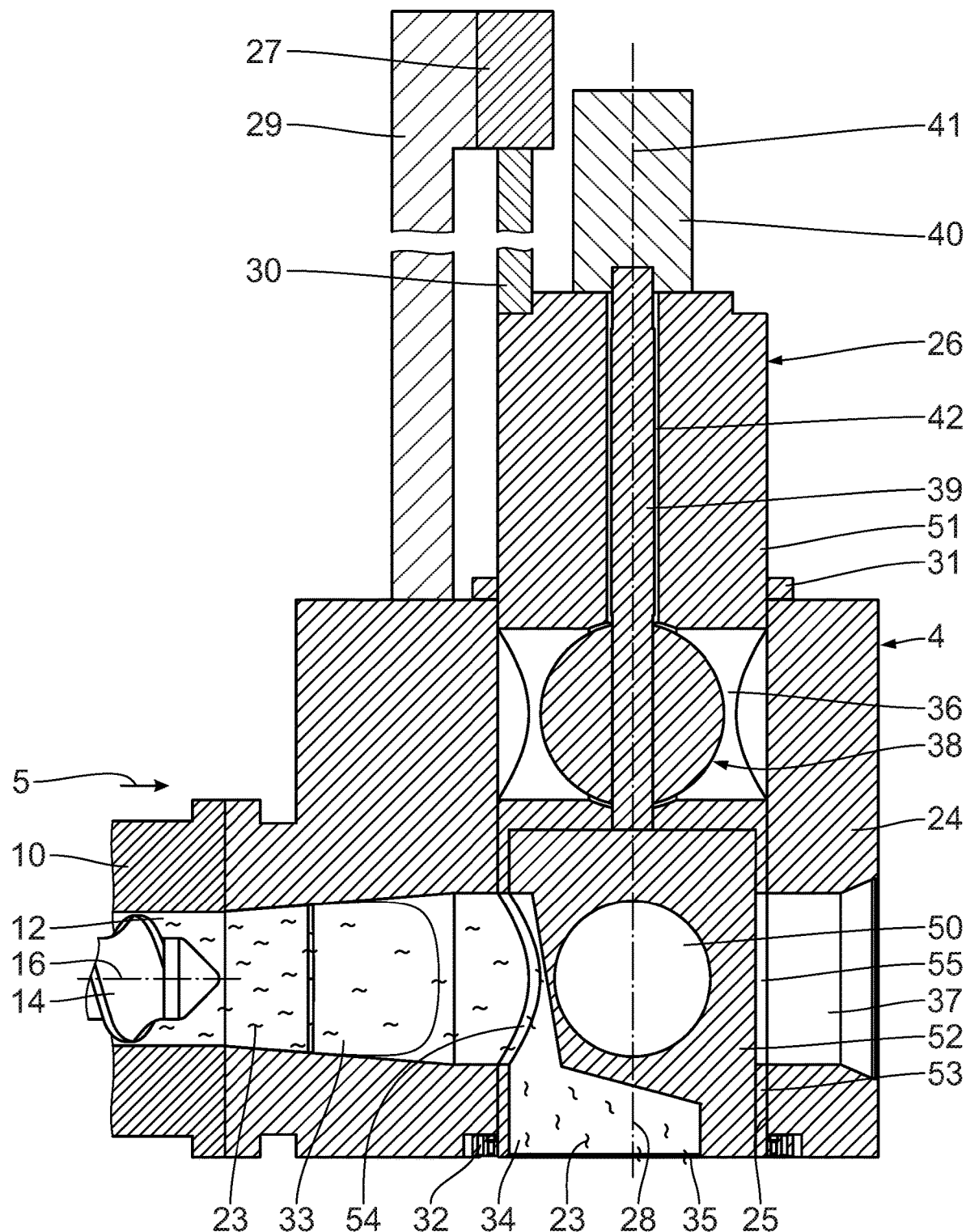
FIG. 9 shows a section through a starting-valve throttle device according to a fourth exemplary embodiment, in an evacuation position.

A fourth exemplary embodiment of the invention is described hereunder by means of FIG. 9. By contrast to the preceding exemplary embodiments, the switching member 26 is configured in two parts. The switching member 26 comprises a first switching-member component 51 which on an end that faces away from the switching-member drive 40 is configured so as to be hollow-cylindrical and configures a receptacle 53 for a cylindrical second switching-member component 52. The second switching-member component 52 in the receptacle 53 is mounted so as to be pivotable about the throttle-member pivot axis 41 and is connected to the throttle-member drive shaft 39. In the evacuation position, the switching-member components 51, 52 configure the evacuation duct 34 which connects the entry duct 33 to the evacuation opening 35. This is visualized in FIG. 9. Additionally, an available passage duct 50 in which no throttle member is disposed is configured in the second switching-member component 52. In a non-throttled delivery position, the second switching-member component 52 is pivoted, in particular by 90°, relative to the first switching-member component 51 such that the available passage duct 50 connects the entry duct 33 to the delivery duct 37. The pivoting of the second switching-member component 52 is performed by means of the throttle-member drive 40 which by way of the throttle-member drive shaft 39 is connected to the second switching-member component 52. In order for the evacuation duct 34 to be configured, and in order for the available passage duct 50 to be configured, the first switching-member component 51 in the hollow-cylindrical portion has an entry opening 54 and an exit opening 55. The passage duct 36 and the throttle member 38 in the manner already described are configured, or disposed, respectively, in the first switching-member component 51. In terms of the further construction and of the further functional mode reference is made to the preceding exemplary embodiments.

The starting-valve throttle device 4 according to the invention is of simple and compact construction and has a minor installation length such that the starting-valve throttle device 4 in a minimum throttle position of the throttle member 38 causes a minor pressure loss. On account thereof, the required energy input into the melt 23 is comparatively minor such that the temperature of the melt 23 is reduced, on the one hand, and a potential rotating speed range of the screw extruder 3 in operation is enlarged, on the other hand. The pressure required in the screw extruder 3, by virtue of the minor pressure loss of the starting-valve throttle device 4, can be lower such that the wear in the screw extruder 3 and in the starting-valve throttle device 4 is lower, and the service life of the screw extruder 3 and of the starting-valve throttle device 4 is increased. The starting-valve throttle device 4 thus has a high reliability.

The starting-valve throttle device 4 in operation is energy-efficient and enables an energy-efficient operation of the screw extruder 3 by virtue of the comparatively minor pressure loss of the melt 23 when flowing through the starting-valve throttle device 4 in the minimum throttle position, or in the non-throttled delivery position, respectively. The starting-valve throttle device 4 moreover enables an increase in terms of the throughput. A downstream melt pump for the pressure build-up in the melt 23 can be dispensed with. The throttle-member drive 40 is preferably repositionable conjointly with the switching member 26, such that the relative position of the throttle member 38 and of the throttle-member drive 40 in relation to the switching member 26 is not varied when switching between the evacuation position and the delivery position. Alternatively, the throttle-member drive 40 can be fastened to the housing 24 such that the throttle member 38 when switching between the evacuation position and the delivery position is repositioned relative to the switching member 26.

The switching member 26 in operation is preferably repeatedly repositioned slightly from the delivery position, thus is slightly pivoted or slightly repositioned in a linear manner, and subsequently moved back to the delivery position. It is avoided on account thereof, that melt 23 which during the starting procedure has made its way into a gap between the switching member 26 and the housing 24 and remains therein over a comparatively long time period and solidifies in the gap, permanently impedes the movement of the switching member 26. The material created by the solidification of the melt is released in the gap by the slight repositioning of the switching member 26. The reliability of the starting-valve throttle device 4 is enhanced on account thereof.

What is claimed is:

1. A starting-valve throttle device for delivering a melt from a screw extruder, the starting-valve throttle device comprising:
    a housing and a housing recess configured therein;
    an entry duct for feeding the melt, said entry duct being configured in the housing and opening into the housing recess;
    a delivery duct for delivering the melt, said delivery duct being configured in the housing and opening into the housing recess;
    an evacuation opening for evacuating the melt during a starting procedure of the screw extruder;
    a switching member disposed in the housing recess so as to be repositionable between an evacuation position and a delivery position, wherein the switching member in the evacuation position at least in portions configures an evacuation duct for connecting the entry duct to the evacuation opening, wherein the switching member in the delivery position configures a passage duct for connecting the entry duct and the delivery duct;
    a throttle member disposed in the passage duct, wherein the throttle member is repositionable relative to the switching member via a throttle-member drive so as to be activatable independently of the switching member.

2. The starting-valve throttle device according to claim 1, wherein the throttle member is pivotable about a throttle-member pivot axis.

3. The starting-valve throttle device according to claim 1, wherein the throttle-member drive is fastened to the switching member.

4. The starting-valve throttle device according to claim 1, wherein the throttle member is fastened to a throttle-member driveshaft, and the throttle-member driveshaft at least in portions extends through the switching member.

5. The starting-valve throttle device according to claim 1, wherein the throttle member for absorbing compressive forces that act in a flow direction of the melt is fastened so as to be eccentric on a throttle-member driveshaft.

6. The starting-valve throttle device according to claim 1, wherein the passage duct from an entry opening to a throttle-member pivot axis of the throttle member has, at least in portions, a cross section area that increases in size.

7. The starting-valve throttle device according to claim 1, wherein the passage duct at an entry opening has an available flow cross section area $A_1$, and in a minimum throttle position of the throttle member the following applies to an available flow cross section area $A_2$ along the throttle member: $0.5 \leq A_2/A_1 \leq 1.3$.

8. The starting-valve throttle device according to claim 1, wherein the switching member is repositionable by means of the switching-member drive.

9. The starting-valve throttle device according to claim 1, wherein the switching member configures a switching-member repositioning axis.

10. The starting-valve throttle device according to claim 9, wherein the throttle-member pivot axis and the switching-member repositioning axis run so as to be mutually parallel.

11. The starting-valve throttle device according to claim 10, wherein the throttle-member pivot axis and the switching-member repositioning axis run so as to be mutually concentric.

12. The starting-valve throttle device according to claim 9, wherein the switching member is pivotable about the switching-member repositioning axis.

13. The starting-valve throttle device according to claim 9, wherein the switching member is repositionable in a linear manner along the switching-member repositioning axis.

14. The starting-valve throttle device according to claim 1, wherein in a non-throttled delivery position an available passage duct for connecting the entry duct and the delivery duct is configured in the switching member.

15. The starting-valve throttle device according to claim 1, further comprising:
a switching member drive configured to actuate the switching member, wherein the throttle member drive and the switching member drive are configured to be operated independent of one another.

16. The starting-valve throttle device according to claim 1, further comprising:
a switching member drive configured to actuate the switching member, the throttle member drive being located at a spaced location from the switching member drive.

17. The starting-valve throttle device according to claim 1, further comprising:
a switching member drive configured to actuate the switching member.

18. A system for preparing bulk material, the system comprising: a screw extruder for melting the bulk material and providing a melt; and a starting-valve throttle device comprising: a housing and a housing recess configured therein; an entry duct for feeding the melt, said entry duct being configured in the housing and opening into the housing recess; a delivery duct for delivering the melt, said delivery duct being configured in the housing and opening into the housing recess; an evacuation opening for evacuating the melt during a starting procedure of the screw extruder; a switching member disposed in the housing recess and is so as to be repositionable between an evacuation position and a delivery position, wherein the switching member in the evacuation position at least in portions configures an evacuation duct for connecting the entry duct to the evacuation opening, wherein the switching member in the delivery position configures a passage duct for connecting the entry duct and the delivery duct, wherein duct; and a throttle member disposed in the passage duct, wherein the throttle member is so as to be repositionable relative to the switching member via a throttle-member drive so as to be activatable independently of the switching member.

19. A method for delivering a melt from a screw extruder by means of a starting-valve throttle device, the method comprising the following steps:
providing the screw extruder;
providing a starting-valve throttle device comprising:
a housing and a housing recess configured therein;
an entry duct for feeding the melt, said entry duct being configured in the housing and opening into the housing recess;
a delivery duct for delivering the melt, said delivery duct being configured in the housing and opening into the housing recess;
an evacuation opening for evacuating the melt during a starting procedure of the screw extruder; and
a switching member disposed in the housing recess so as to be repositionable between an evacuation position and a delivery position, wherein the switching member in the evacuation position at least in portions configures an evacuation duct for connecting the entry duct to the evacuation opening, wherein the switching member in the delivery position configures a passage duct for connecting the entry duct and the delivery duct;
a throttle member disposed in the passage duct, wherein the throttle member is repositionable relative to the switching member via a throttle-member drive so as to be activatable independently of the switching member;
repositioning the switching member from an evacuation position to a delivery position;
delivering melt through the passage duct of the switching member and the delivery duct; and
pivoting the throttle member relative to the switching member in the passage duct via the throttle-member drive.

20. The method according to claim 19, wherein the switching member situated in the delivery position is repeatedly repositioned so as to avoid any blocking of the switching member by virtue of melt which has made its way between the switching member and the housing.

* * * * *